Patented Sept. 13, 1949

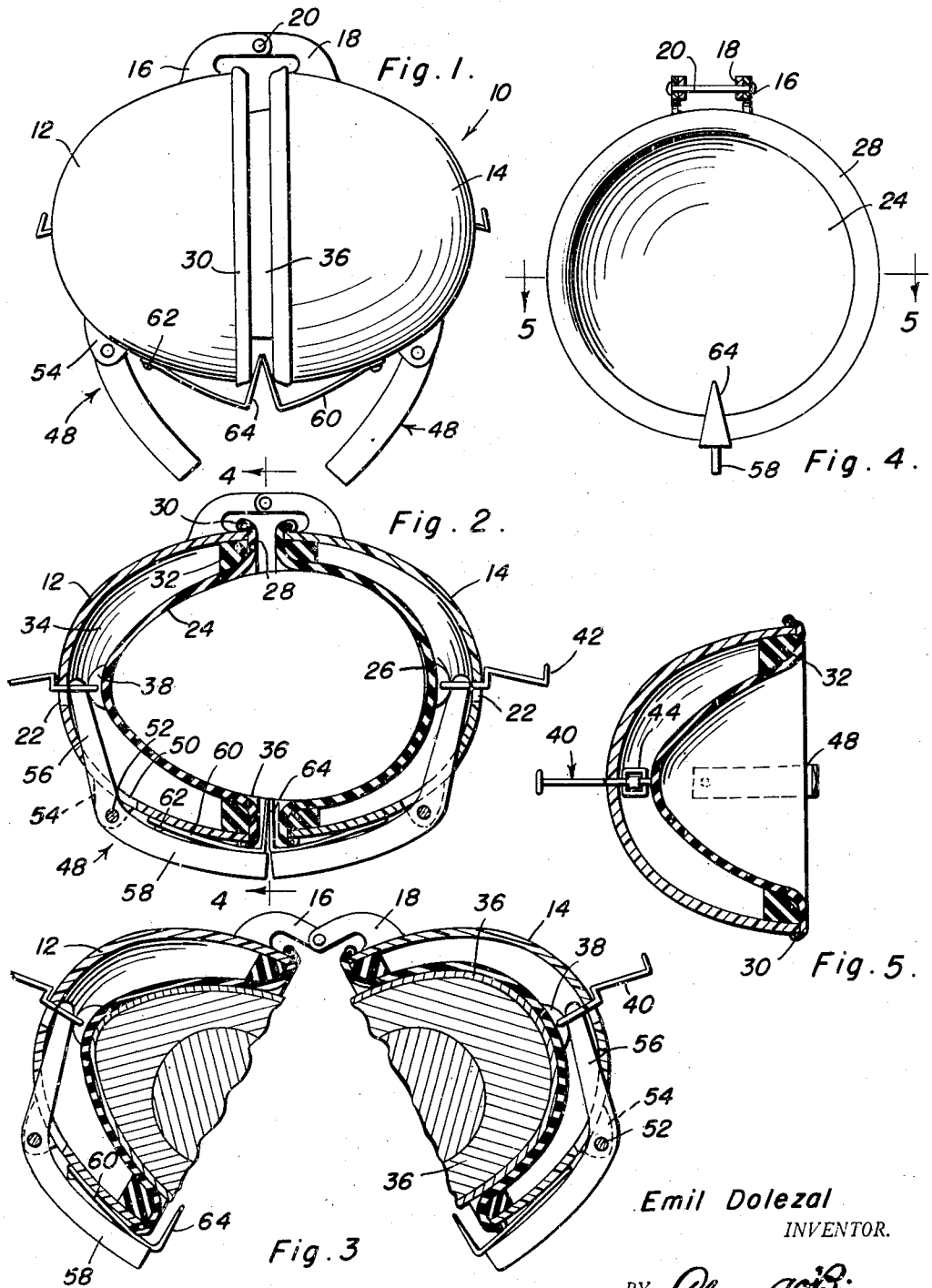

2,481,579

UNITED STATES PATENT OFFICE 2,481,579

EGG CRACKER

Emil Dolezal, Butte, Mont.

Application July 16, 1948, Serial No. 39,112

2 Claims. (Cl. 146—2)

This invention relates to a device improving the separating and opening of eggs and a primary object of the invention consists in providing means for holding an egg while it is cracked open, and when the device is opened, the contents of the egg are cleanly and readily extracted.

Another object of the invention is to provide vacuum suction to retain the device in operative position, such suction being obtained by connection of a wire spring to a rubber insert, and, by pulling thereon, creating a vacuum to hold the device operative, the spring snapping into lock position.

Another object of the invention is to provide a device that is capable of being grasped and manipulated by the hand of the operator.

And yet another object of the invention is to provide means to firmly engage the egg retained therein for the cracking step and, upon opening the device, instantly releasing the egg for use.

Other objects of this invention reside in the details of construction and in the combination of the various parts and in their mode of operation, as will hereinafter appear.

The following is a detailed description of a preferred embodiment of the invention, and is illustrated in the accompanying drawings wherein:

Figure 1 is a side elevation of the invention engaging an egg and ready to crack same;

Figure 2 is a vertical sectional view of the device, and in locked position;

Figure 3 is a view similar to Figure 2, after having pierced an egg and being separated to remove the contents thereof;

Figure 4 is a transverse vertical view of one half of the device and is taken substantially on lines 4—4 of Figure 2; and Figure 5 is a sectional view of the invention, at right angles to Figure 2 and is taken substantially on lines 5—5 of Figure 4.

Referring to the figures, the egg cracker of the invention is identified generally by numeral 10 and consists of two hollow closed cups or shells 12 and 14, pivoted together by a pair of parallel hinges 16 and 18, hinges 18 being received within hinges 16 and pivotally secured thereto by transverse pivot pin 20. Thus, while the egg cracker consists of two separate halves, they are secured together for unitary movement. Shell halves 12 and 14 are suitably slotted at 22 at each extremity thereof, for a purpose soon to be described. Egg holders or suction cups 24 and 26 are secured respectively to shells 12 and 14 by means of annular rims 28, rims 28 terminating in outturned lips 30, lips 30 securely grasping the free extremities of shells 12 and 14.

Cups or shells 12 and 14 are preferably made of plastic, although any other suitable type of material may be employed, and egg holders 24 and 26 are generally of some resilient material such as rubber. Inserts 32, preferably of sponge material, are placed in position in egg cracker 10 between the shells and the suction cup members, to thereby assist in separating the suction cup members from the shells to provide chamber 34 therebetween and to assist in firmly grasping and retaining an egg 36 therein.

As is clearly illustrated in Figures 2 and 3, suction cup member 24 tapers more than suction cup 26, to simulate the general shape of an egg. Each suction cup member includes a laterally extending ear 38 in alignment with apertures 22, ear 38 being suitably apertured to receive therein wire springs 40. (Figure 5.) Wire springs 40 include a hook 42 and a squared eye bolt portion 44. Spring 40 is secured in ear 38 and extends through slot 22 to the outer extremity of the device.

Actuating or bell crank levers 48 extend through slots 50 in shells 12 and 14, lever 48 being pivotally secured at 52 to depending ears 54 integral with the egg shell halves and thereby retaining bell crank lever therein. Link 56 tapers outwardly and is adapted to bend slightly through the inner space formed by square eye bolts 44 of wire spring 40, the opposite lever members 58 extending exteriorly of the egg cracker and is adapted to be grasped by the fingers of the operator when the device is to be used.

Flat metal piercing springs 60 are secured in any manner at 62 to shells 12 and 14 and include piercing pins 64 tapered to a point and secured at right angles to piercing spring 60. Piercing pins 64 are adapted to penetrate the shell of egg 36 to provide the desired crack whereby the egg is readily separated and the contents removed.

In operation, the device is pivoted into the open position illustrated in Figure 3, after which an egg 36 is inserted therebetween. The shell members are then pivoted together in the position illustrated in Figure 1, suction cup members 24 and 26 together with sponge inserts 32 firmly and securely retaining the egg in fixed position. Lever 58 is then pressed inwardly towards the egg, thereby causing lever member 54 to pivot outwardly, thereby forcing spring 40 into lateral movement until it locks into the position illustrated in Figure 2. While this is occurring, springs 40 are pulling on ears 38, thereby pulling suction cup members 24 and 26 laterally into space 34 and providing a vacuum or suction to retain the egg firmly. Continued movement of bell crank lever 48 engages the extending projection of spring 60 to force them inwardly, thereby causing piercing pins 64 to penetrate the egg. The egg is now cracked and by slightly pulling apart, is readily opened. The contents thereof can be readily scraped out, in the event that soft boiled eggs are being used, while the suction retains the halves firmly in position. Hard boiled eggs are also readily adapted to be employed in this device, and generally are removed in whole condition. When wire lock or springs 40 are released, the egg shells are then readily removed.

While the preferred embodiment of the invention has been shown and described, it is to be understood that various changes in the size, shape and arrangement of parts may be made without departing from the spirit of the invention, or the scope of the appended claims.

What is claimed as the invention is:

1. An egg cracker device consisting of opposed shell members, resilient suction cups secured on said shell members in spaced relation, egg piercing means secured to said shell members and extending between said suction cups, sponge rubber inserts secured between said shell members and suction cups to maintain them in spaced relation, ears depending from said shells, bell crank levers pivotally secured in said ears, one arm of said levers extending into said space, lateral ears on said suction cups, and springs including an eyebolt portion receiving said lever arm secured to said suction cups and extending through said shells, whereby, on actuating said lever, the springs are moved laterally into locking position to create a vacuum.

2. The combination of claim 1 wherein said egg piercing means consists of a resilient spring blade and a piercing pin secured to said blade and extending between said shell members.

EMIL DOLEZAL.

REFERENCES CITED

The following references are of record in the file of this patent:

UNITED STATES PATENTS

| Number | Name | Date |
|---|---|---|
| 808,507 | Blue | Dec. 26, 1905 |
| 1,924,789 | Horvath | Aug. 29, 1933 |
| 2,193,097 | Hildebrand | Mar. 12, 1940 |
| 2,283,390 | Seldomridge | May 19, 1942 |